(12) United States Patent
Zhao et al.

(10) Patent No.: US 11,200,404 B2
(45) Date of Patent: Dec. 14, 2021

(54) FEATURE POINT POSITIONING METHOD, STORAGE MEDIUM, AND COMPUTER DEVICE

(71) Applicant: Tencent Technology (Shenzhen) Company Limited, Shenzhen (CN)

(72) Inventors: Yandan Zhao, Shenzhen (CN); Yichao Yan, Shenzhen (CN); Weijian Cao, Shenzhen (CN); Yun Cao, Shenzhen (CN); Yanhao Ge, Shenzhen (CN); Chengjie Wang, Shenzhen (CN); Jilin Li, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 17/089,435

(22) Filed: Nov. 4, 2020

(65) Prior Publication Data
US 2021/0049347 A1    Feb. 18, 2021

Related U.S. Application Data

(63) Continuation of application No. PCT/CN2019/104241, filed on Sep. 3, 2019.

(30) Foreign Application Priority Data

Sep. 14, 2018    (CN) .......................... 201811073920.0

(51) Int. Cl.
| | | |
|---|---|---|
| *G06K 9/62* | (2006.01) | |
| *G06K 9/00* | (2006.01) | |
| *G06T 7/73* | (2017.01) | |

(52) U.S. Cl.
CPC ..... *G06K 9/00228* (2013.01); *G06K 9/00281* (2013.01); *G06K 9/6256* (2013.01);
(Continued)

(58) Field of Classification Search
CPC ........... G06K 9/00261; G06K 9/00288; G06K 9/00228; G06K 9/00268; G06K 9/00281;
(Continued)

(56) References Cited

U.S. PATENT DOCUMENTS

| | | |
|---|---|---|
| 2002/0051572 A1 | 5/2002 | Matsumoto et al. |
| 2008/0187175 A1 | 8/2008 | Kim et al. |

(Continued)

FOREIGN PATENT DOCUMENTS

| | | |
|---|---|---|
| CN | 101477690 A | 7/2009 |
| CN | 104036240 A | 9/2014 |

(Continued)

OTHER PUBLICATIONS

International Search Report and Written Opinion with English Translation for International Application No. PCT/CN2019/104241 dated Nov. 28, 2019; 11 pages.

(Continued)

*Primary Examiner* — Quan M Hua
(74) *Attorney, Agent, or Firm* — Crowell & Moring LLP

(57) ABSTRACT

This application relates to feature point positioning technologies. The technologies involve positioning a target area in a current image; determining an image feature difference between a target area in a reference image and the target area in the current image, the reference image being a frame of image that is processed before the current image and that includes the target area; determining a target figure point location of the target area in the reference image; determining a target feature point location difference between the target area in the reference image and the target area in the current image according to a feature point location difference determining model and the image feature difference; and positioning a target feature point in the target area in the current image according to the target feature point location (Continued)

of the target area in the reference image and the target feature point location difference.

20 Claims, 6 Drawing Sheets

(52) U.S. Cl.
CPC ...... *G06T 7/74* (2017.01); *G06T 2207/20081* (2013.01); *G06T 2207/30201* (2013.01)

(58) Field of Classification Search
CPC ......... G06K 9/6202; G06K 2009/4666; G06K 9/00362; G06K 9/4642; G06K 9/6206; G06K 9/6255; G06K 9/6256; G06K 9/00275; G06K 9/00308; G06K 9/00926; G06K 9/3233; G06K 9/4671; G06K 9/6215; G06K 9/6228; G06K 9/6262; G06K 9/627; G06K 9/6276; G06K 9/629; G06N 3/0454; G06N 3/084; G06N 3/08; G06T 11/00; G06T 2207/10016; G06T 2207/10024; G06T 2207/20081; G06T 2207/30201; G06T 2207/30241; G06T 2207/30244; G06T 7/251; G06T 7/74; G06T 7/80
See application file for complete search history.

(56) References Cited

U.S. PATENT DOCUMENTS

| | | | |
|---|---|---|---|
| 2015/0055855 A1* | 2/2015 | Rodriguez | G06K 9/627 382/159 |
| 2016/0323526 A1* | 11/2016 | Washisu | H04N 5/3696 |
| 2017/0046825 A1* | 2/2017 | Xu | G06T 7/13 |
| 2018/0018503 A1 | 1/2018 | Wang | |
| 2018/0137630 A1 | 5/2018 | Ma et al. | |

FOREIGN PATENT DOCUMENTS

| | | |
|---|---|---|
| CN | 105760826 A | 7/2016 |
| CN | 106683110 A | 5/2017 |
| CN | 108256479 A | 7/2018 |
| CN | 108509825 A | 9/2018 |
| CN | 109344742 A | 2/2019 |
| WO | WO 2017/041303 A1 | 3/2017 |

OTHER PUBLICATIONS

Office Action for Chinese Patent Application No. CN201811073920.0 dated Apr. 24, 2020; 12 pages.
Office Action for Chinese Patent Application No. CN201811073920.0 dated Oct. 10, 2020; 10 pages.
Extended European Search Report for European Patent Application No. 19860589.1 dated Oct. 8, 2021, 8 pages.

* cited by examiner

FEATURE POINT POSITIONING METHOD, STORAGE MEDIUM, AND COMPUTER DEVICE

RELATED APPLICATION

This application is a continuation application of the International PCT Application No. PCT/CN2019/104241, filed with the China National Intellectual Property Administration, PRC on Sep. 3, 2019 which claims priority to Chinese Patent Application No. 201811073920.0, entitled "FEATURE POINT POSITIONING METHOD AND APPARATUS, STORAGE MEDIUM, AND COMPUTER DEVICE" and filed with the China National Intellectual Property Administration, PRC on Sep. 14, 2018, both of which are incorporated herein by reference in their entireties.

FIELD OF THE TECHNOLOGY

This disclosure relates to the field of computer technologies, and in particular, to a method, a storage medium, and a computer device for feature point positioning.

BACKGROUND OF THE DISCLOSURE

With rapid development of computer technologies and image processing technologies, more and more fields involve the need to position feature points in an image during image processing, to perform subsequent application according to the positioned feature points. For example, face feature points positioned in a face image may be used in a scenario such as expression recognition or face recognition.

However, in many application scenarios, a case that a target area is blocked may occur. For example, a face area may be blocked by hair, a hand, or the like. In a conventional feature point positioning technology, when a target area is blocked, inaccurate feature point positioning may occur.

SUMMARY

Embodiments of the present disclosure provide a method, a storage medium, and a computer device for feature point positioning, to improve accuracy of feature point positioning. The solutions are as follows.

A feature point positioning method is provided, performed by a computer device, the method including:

positioning a target area in a current image;

determining an image feature difference between a target area in a reference image and the target area in the current image, the reference image being a frame of image that is processed before the current image and that includes the target area;

determining a target figure point location of the target area in the reference image;

determining a target feature point location difference between the target area in the reference image and the target area in the current image by using a feature point location difference determining model and the image feature difference; and positioning a target feature point in the target area in the current image according to the target feature point location of the target area in the reference image and the target feature point location difference.

An apparatus for feature point positioning is provided. The apparatus includes a memory for storing computer instructions; and a processor in communication with the memory. When the processor executes the computer instructions, the processor is configured to cause the apparatus to:

position a target area in a current image;

determine an image feature difference between a target area in a reference image and the target area in the current image, the reference image being a frame of image that is processed before the current image and that comprises the target area;

determine a target figure point location of the target area in the reference image;

determine a target feature point location difference between the target area in the reference image and the target area in the current image according to a feature point location difference determining model and the image feature difference; and position a target feature point in the target area in the current image according to the target feature point location of the target area in the reference image and the target feature point location difference.

A computer device is provided, including:

a target area positioning module, configured to position a target area in a current image;

an image feature difference determining module, configured to determine an image feature difference between a target area in a reference image and the target area in the current image, the reference image being a frame of image that is processed before the current image and that includes the target area;

a location difference determining module, configured to determine a target feature point location difference between the target area in the reference image and the target area in the current image by using a feature point location difference determining model and the image feature difference; and a target feature point positioning module, configured to position a target feature point in the target area in the current image according to a target feature point location of the target area in the reference image and the target feature point location difference.

In this disclosure, a module may be hardware such as a combination of electronic circuitries, firmware, or software such as computer instructions. The module may also be any kind of combination of hardware, firmware, and software.

In an optional implementation, the target area is a face area and the target feature point is a face feature point. The computer device further includes:

a reference image processing module, configured to obtain an image according to a time sequence; detect a face area in the obtained image; determine the image in which the face area is detected as the reference image in a case that the face area is detected in the obtained image; and use, after the reference image is determined, an image that continues to be obtained as the current image.

In an optional implementation, the reference image processing module is further configured to query a reference image replacement condition; and use, in a case that the image that continues to be obtained is used as the current image, the current image obtained in a case that the reference image replacement condition is met as a new reference image.

In an optional implementation, the reference image processing module is further configured to position a face area in the reference image; capture a reference face image according to the face area positioned in the reference image; input the reference face image into a first image feature extraction model; obtain a reference image feature outputted by the first image feature extraction model; and use the reference image feature as an input to a feature point positioning model, to obtain a target feature point location of the target area in the reference image.

In an optional implementation, the reference image processing module is further configured to determine a first confidence level of the reference face image by using a first target determining model and the reference image feature; perform the operation of using the reference image feature as an input to a feature point positioning model, to obtain the target feature point location of the target area in the reference image in a case that the first confidence level reaches a first preset confidence level threshold; and optionally end face feature point tracking and positioning in a case that the first confidence level does not reach the first preset confidence level threshold.

In an optional implementation, the target area positioning module is further configured to query a target feature point location of a target area in a previous frame of image of the current image; determine a target preselection area in the current image according to the queried target feature point location of the target area in the previous frame of image; and expand the target preselection area in the current image according to a preset multiple, to obtain the target area in the current image.

In an optional implementation, the image feature difference determining module is further configured to calculate an image pixel difference between the target area in the reference image and the target area in the current image; input the image pixel difference into a second image feature extraction model; and obtain the image feature difference outputted by the second image feature extraction model.

In an optional implementation, the location difference determining module is further configured to determine a second confidence level of the target area by using a second target determining model and the image feature difference; determine a target feature point location difference between the target area in the reference image and the target area in the current image by using a feature point location difference determining model and the image feature difference in a case that the second confidence level reaches a second preset confidence level threshold; and end target feature point tracking and positioning in a case that the second confidence level does not reach the second preset confidence level threshold.

In an optional implementation, the computer device further includes: a model training module.

The model training module is configured to obtain training sample images; position a sample target area in each training sample image; determine a sample target feature point location in the sample target area of the each training sample image; determine a sample target feature point location difference between every two of the training sample images; and use a sample image feature difference between sample target areas in any two frames of training sample images as model training input data, and use a sample target feature point location difference between the any two frames of training sample images as a training label, to train the feature point location difference determining model.

In an optional implementation, the model training module is further configured to use a sample image pixel difference between the sample target areas in the any two frames of training sample images as model training input data of a second image feature extraction model; use an output of the second image feature extraction model as an input to the feature point location difference determining model, the output of the second image feature extraction model being the sample image feature difference between the sample target areas in the any two frames of training sample images; and use the sample target feature point location difference between the any two frames of training sample images as the training label, to train the second image feature extraction model and the feature point location difference determining model.

In an optional implementation, the model training module is further configured to use the sample image pixel difference between the sample target areas in the any two frames of training sample images as positive sample data; use a sample image pixel difference between a sample target area in the training sample image and a non-sample target area as negative sample data; and train the second target determining model according to the positive sample data and the negative sample data.

In an optional implementation, the target feature point positioning module is further configured to add an additional element to the current image according to the target feature point positioned in the target area of the current image.

A non-transitory computer-readable storage medium is provided, storing a computer program, the computer program, when executed by a processor, causing the processor to perform the following operations:

positioning a target area in a current image;

determining an image feature difference between a target area in a reference image and the target area in the current image, the reference image being a frame of image that is processed before the current image and that includes the target area;

determining a target feature point location difference between the target area in the reference image and the target area in the current image by using a feature point location difference determining model and the image feature difference; and positioning a target feature point in the target area in the current image according to a target feature point location of the target area in the reference image and the target feature point location difference.

A computer device is provided, including a memory and a processor, the memory storing a computer program, and the computer program, when executed by the processor, causing the processor to perform the following operations:

positioning a target area in a current image;

determining an image feature difference between a target area in a reference image and the target area in the current image, the reference image being a frame of image that is processed before the current image and that includes the target area;

determining a target figure point location of the target area in the reference image;

determining a target feature point location difference between the target area in the reference image and the target area in the current image by using a feature point location difference determining model and the image feature difference; and positioning a target feature point in the target area in the current image according to the target feature point location of the target area in the reference image and the target feature point location difference.

In the feature point positioning method, the storage medium, and the computer device, after a target area is positioned in a current image, an image feature difference between a target area in a reference image and the target area in the current image is automatically determined. In this way, a target feature point location difference between the target area in the reference image and the target area in the current image may be determined by using a feature point location difference determining model and the image feature difference. Because the reference image is a frame of image processed before the current image, a target feature point may be positioned in the target area in the current image with reference to a target feature point location of the target area in the reference image and the foregoing obtained target feature point location difference. In this way, when the target feature point is positioned for the current image, final feature point positioning is performed with reference to image information of a processed image and according to a target feature point difference between images, thereby improving accuracy of feature point positioning. In addition, compared with a case that a feature point is positioned only according to the current image, by repeatedly using the image information of the processed image, sudden location change of the same feature point between different frames of images may be smoothed, thereby avoiding jitter of a feature point to a great extent.

DESCRIPTION OF EMBODIMENTS

To make the objectives, technical solutions, and advantages of this application clearer and more comprehensible, the following further describes this application in detail with reference to the accompanying drawings and the embodiments. It is to be understood that the specific embodiments described herein are only used for describing this application, and are not intended to limit this application.

Figure 1:
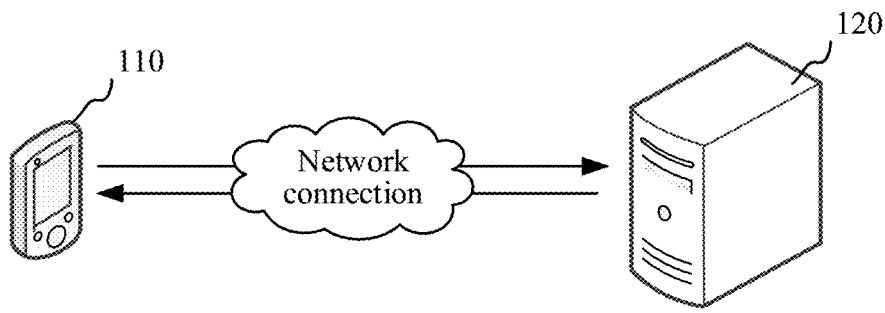
FIG. 1 is a diagram of an exemplary application environment of a feature point positioning method according to an embodiment.

FIG. 1 is a diagram of an exemplary application environment of a feature point positioning method according to an embodiment. Referring to FIG. 1, the feature point positioning method is applied to a feature point positioning system. The feature point positioning system includes a terminal 110 and a server 120. The terminal 110 is connected to the server 120 by using a network. The terminal 110 may be a desktop terminal or a mobile terminal, and the mobile terminal may be at least one of a mobile phone, a tablet computer, a notebook computer, and the like. The server 120 may be a single server, or may be a server cluster including a plurality of servers. Both the terminal 110 and the server 120 may be configured to perform the feature point positioning method independently. In this disclosure, positioning an object may also refer to locating the object, or finding location of the object.

For example, the terminal 110 or the server 120 may position a target area in a current image; the terminal 110 or the server 120 determines an image feature difference between a target area in a reference image and the target area in the current image; the terminal 110 or the server 120 determines a target feature point location difference between the target area in the reference image and the target area in the current image according to a feature point location difference determining model and the image feature difference; and the terminal 110 or the server 120 positions a target feature point in the target area in the current image according to a target feature point location of the target area in the reference image and the target feature point location difference.

The reference image is a frame of image that is processed before the current image and includes the target area. The current image may be an image acquired in real time by the terminal 110 through a built-in or externally connected image acquisition apparatus. Alternatively, the current image may be a video frame in an existing video. After acquiring an image, the terminal 110 may perform the feature point positioning method locally, or send the acquired image to the server 120, and the server 120 performs the feature point positioning method. Certainly, the terminal 110 may process an image in an existing video locally, or the server 120 may process an image in an existing video.

Figure 2:
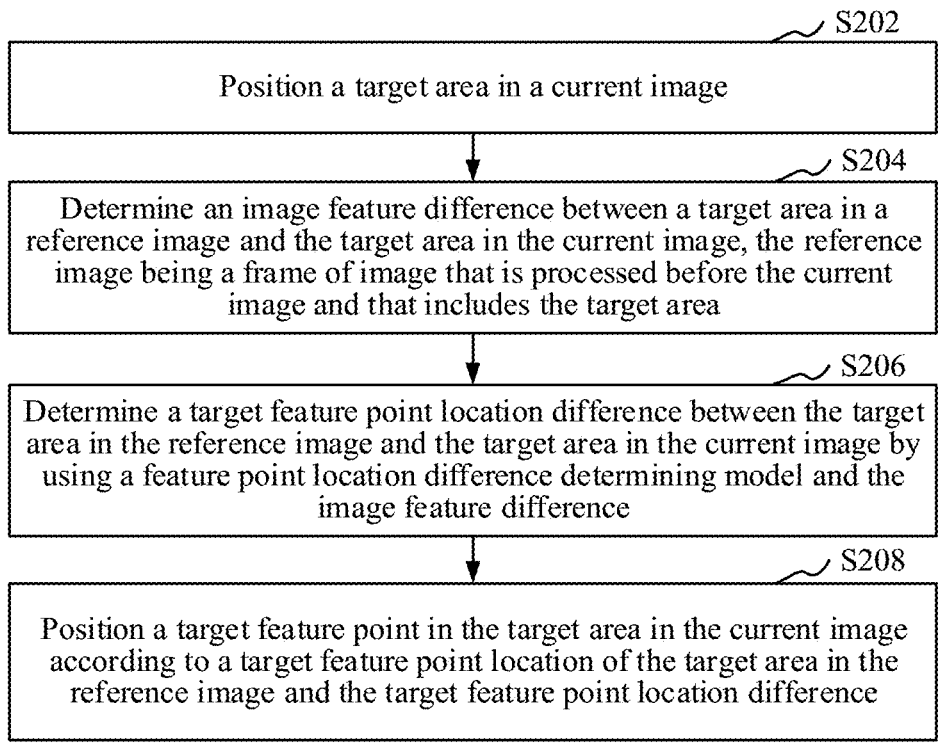
FIG. 2 is a schematic flowchart of a feature point positioning method according to an embodiment.

FIG. 2 is a schematic flowchart of a feature point positioning method according to an embodiment. In this embodiment, an example of applying the feature point positioning method to a computer device is used for description. The computer device may be the terminal 110 or the server 120 shown in FIG. 1. Referring to FIG. 2, the feature point positioning method may include the following steps.

S202. Position a target area in a current image.

The current image is an image that needs to be processed at present, for example, the current image may be an image acquired in real time, or may be a video frame included in a video.

In an embodiment, when the computer device is a terminal, the terminal may acquire an image according to a fixed or dynamic frame rate, and use the acquired image as a current image. Images with a fixed or dynamic frame rate may form successive dynamic pictures or be synthesized to a video.

In an embodiment, when the computer device is a terminal, the terminal may use a built-in or externally connected image acquisition apparatus to capture an image in the current field of view of the image acquisition apparatus, and use the captured image as a to-be-processed current image. The field of view of the image acquisition apparatus may change as a posture or a position of the terminal change. The image acquisition apparatus of the terminal may be a front-facing camera or a rear-facing camera.

In an embodiment, when the computer device is a terminal, the terminal may receive an image acquired and sent by another terminal, and use the received image as a current image. For example, when a video session is established between a plurality of terminals by using a social networking application running on each terminal, a terminal in the video session may receive an image sent by another terminal and use the received image as a current image.

In an embodiment, when the computer device is a server, after obtaining an image, the terminal in the foregoing embodiment may upload the image to the server, so that the server use the uploaded image as a current image.

In another embodiment, the computer device may alternatively obtain, according to a sequence of video frames included in a video, a video frame included in the video as a current image.

The target area is an area including a target in an image. The target may be a static target, for example, a building. Alternatively, the target may be a dynamic target, for example, a face of a natural person or a plane. Then, in different image frames, the target area may be a static area, or may be a dynamic area. The target area may be an area such as a face area or a hand area. In an exemplary solution, the target area may be a rectangular area, or may be an area of another specified shape, for example, the target area may be a circular area, a triangular area, or the like.

In an embodiment, the computer device may input a current image into a target detection model, and determine a target area of the current image by using the target detection model. For example, the computer device may determine an image location of the target area by using the target detection model (e.g., an SSD model or an RCNN model), or may perform semantic segmentation by using a target detection model (e.g., a Unet model) to determine a pixel point set of target semantics, to find the target area in the current image.

In an embodiment, S202 includes: querying a target feature point location of a target area in a previous frame of image of the current image; determining a target preselection area in the current image according to the queried target feature point location of the target area in the previous frame of image; and then expanding the target preselection area in the current image according to a preset multiple, to obtain the target area in the current image.

The target feature point location is location information of a target feature point in an image. For example, the target feature point location may be coordinate information representing a feature point pixel location. The target feature point includes a key point having a representational capability in the target area. For example, when the target area is a face area, the target key point includes a face feature point, and the face feature point may be, but is not limited to, a key point such as an eye, a nose, a mouth, an eyebrow, or a face contour.

Figure 3:
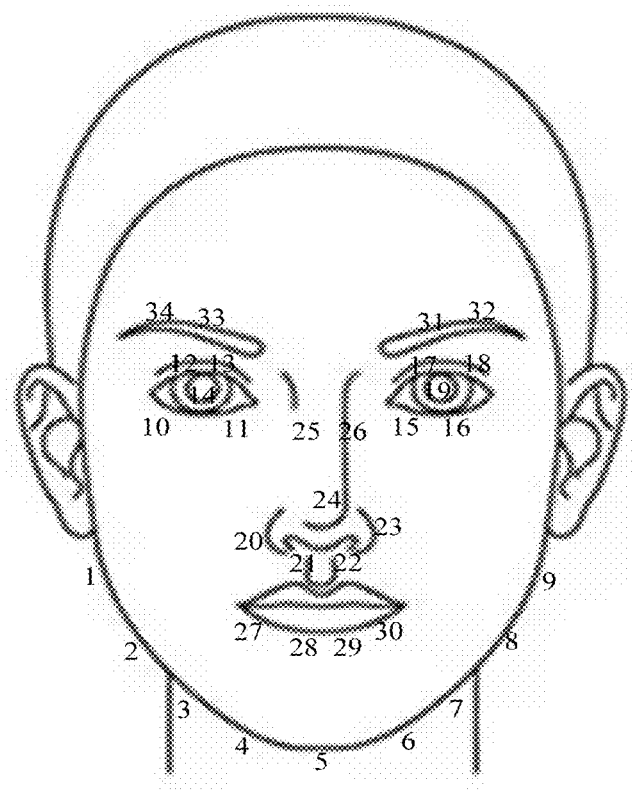
FIG. 3 is a schematic diagram of face feature points in a face image according to an embodiment.

FIG. 3 is a schematic diagram of face feature points in a face image according to an embodiment. The face feature points include: face contour key points, that is, points from 1 to 9 in the figure, left eye key points and right eye key points, that is, points from 10 to 14 and points from 15 to 19 in the figure, nose key points, that is, points from 20 to 26 in the figure, mouth key points, that is, points from 27 to 30 in the figure, left eyebrow key points and right eyebrow key points, that is, points 31 and 32 and points 33 and 34 in the figure, and the like. It may be understood that, the face feature points shown in FIG. 3 are only used as an example for description, and a quantity and location of feature points in this embodiment of this application is not limited. Positioned face feature points in an actual scenario may include more or fewer face feature points than those shown in FIG. 3.

The target preselection area is a preselection area for determining the target area. It may be understood that, in a frame of image, an area of a target feature point location may be considered as a target area of the image, while in different images, the target area may be a static area or a dynamic area, and dynamic changes of the target area are continuous. That is, a target area in a previous frame of image may be used as a target preselection area in a current image, and then the target preselection area may be expanded, to obtain a target area in the current image. Using a video as an example, a location change of a face in the video frames may be continuous.

This application may be a solution applied to feature point positioning on a series of images. Therefore, when being processed, each frame of image in the series of images is a to-be-processed current image. There may be a plurality of frames of images that have not been processed after the current image, or there may be a plurality of frames of processed images before the current image. In this way, each time after completing a particular point positioning on a frame of image, the computer device may store a target feature point location positioned in the image for subsequent use.

For example, after obtaining a to-be-processed current image, the computer device may query a target feature point location of a target area in a previous frame of image of the current image. In this way, the computer device may determine the target area in the previous frame of image according to the queried target feature point location, then the computer device may obtain the target area in the current image by determining a target preselection area in the current image and expanding the target preselection area in the current image according to a preset multiple. For example, in one implementation, the preset multiple may be 1.3, or may be another multiple such as 1.2 or 1.4.

It may be understood that the current image in this embodiment may not be the first frame of image of a series of images. Before the first frame of image, there is no previous image that may be used as a reference image for determining a target preselection area. Therefore, the target area of the first frame of image needs to be positioned in a complete image rather than a selected area of the image according to another embodiment.

Certainly, in this embodiment of this disclosure, the reference image as a basis for determining a target area of a current image is not limited to the previous frame of image of the current image. The reference image may be an nth previous frame of image of the current image, where n is a positive integer.

In this embodiment, according to prior knowledge of motion continuity, it may be considered that, in a relatively large probability, the target area in the current image may be located near the target area in the nth previous frame of image of the current image, especially near the target area in the previous frame of image of the current image. That is, theoretically, any nth previous frame of image of the current image may be used as a basis for positioning the target area in the current image. Therefore, when the target area is positioned in the current image, a complete search in a whole image area may not be needed, and the search is rather limited to a selected area, thereby improving efficiency of positioning the target area.

S204. Determine an image feature difference between a target area in a reference image and the target area in the current image, the reference image being a frame of image that is processed before the current image and that includes the target area.

The reference image is an image used as a reference to position a feature point in the current image. The image feature difference is a difference between image features of two images. The image feature herein may be data having a feature of representing a target.

For example, the computer device may separately extract image pixel information of the target area in the reference image and in the current image; and then separately input the extracted image pixel information to a single-frame image feature extraction model, to obtain image features outputted by the single-frame image feature extraction model, that is, an image feature of the target area in the reference image and an image feature of the target area in the current image. The computer device may then calculate a difference between the two image features, to obtain the image feature difference between the target areas in the two images. The single-frame image feature extraction model may be a machine learning (ML) model that is trained in advance and used for performing image feature extraction according to image pixel information of a target area in a single frame of image.

The image pixel information may be an image pixel matrix. The image may be a grayscale image or a color image. There may be one or more image pixel matrices of the image. The grayscale image usually includes one channel. In this case, the grayscale image includes an image pixel matrix, that is, a matrix formed by arranging grayscale values of pixel points in the grayscale image according to pixel locations. The color image usually includes three channels, that is, an R channel, a G channel, and a B channel. Therefore, the color image usually includes three image pixel matrices, that is, three matrices respectively formed by arranging all channel values of pixel points in the color image according to pixel locations.

In an embodiment, the determining an image feature difference between a target area in a reference image and the target area in the current image includes: calculating an image pixel difference between the target area in the reference image and the target area in the current image; inputting the obtained image pixel difference to a second image feature extraction model; and obtaining the image feature difference outputted by the second image feature extraction model.

The second image feature extraction model maybe a machine learning (ML) model that is trained in advance and used for performing image feature extraction according to an image pixel difference between target areas in two images. The ML model may have certain capabilities through sample learning. The ML model may be a neural network model, a support vector machine, a logistic regression model, or the like. It may be understood that, both the second image feature extraction model herein and the single-frame image feature extraction model in the foregoing embodiment are image feature extraction models. Optionally, because input data of the models is different, parameters of the models may also be different.

For example, after separately extracting the image pixel information of the target area in the reference image and the image pixel information of the target area in the current image, the computer device may first calculate an image pixel difference between the target area in the reference image and the target area in the current image, subsequently input the calculated image pixel difference to a second image feature extraction model, process the inputted image pixel difference by using the second image feature extraction model, and then obtain the image feature difference outputted by the second image feature extraction model.

The image pixel information may be an image pixel matrix, and the image pixel difference may be a difference between image pixel matrices of target areas in two images.

In an exemplary embodiment, the second image feature extraction model may be a complex network model formed by interconnecting a plurality of layers. The second image feature extraction model may include a plurality of feature transform layers, and each feature transform layer includes corresponding model parameters. There may be a plurality of model parameters at each layer. A model parameter in each feature transform layer is applied for linear or non-linear transformations on input data, to obtain a feature map as an operation result. Each feature transform layer receives an operation result of a previous layer, and through an operation of the feature transform layer, outputs an operation result of the current layer to a next layer. The model parameters include each parameter in a model structure and may reflect a correspondence between an input and an output of the model. The feature transform layer includes but is not limited to a convolution layer, a fully connected layer, or the like. A specific quantity of convolution layers or fully connected layers may be set according to actual requirements.

In the foregoing embodiments, after a current image is obtained, an image pixel difference between a target area in a reference image and a target area in the current image is calculated, the image pixel difference is inputted into a trained ML model, and an image feature difference is obtained according to the ML model, to improve accuracy of image feature difference extraction by using a powerful learning capability and a computing capability of the ML model.

S206. Determine a target feature point location difference between the target area in the reference image and the target area in the current image by using a feature point location difference determining model and the image feature difference.

The feature point location difference determining model is an ML model that is trained in advance and used for determining a feature point location difference according to an image feature difference between target areas in two images. Similarly, the feature point location difference determining model may also be a complex network model formed by interconnecting a plurality of layers. For description of the network model, reference may be made to the description in the foregoing embodiment. Details are not described herein again.

The target feature point location difference is a location difference between target feature points of target areas in two images. The target area may include one or more target feature points. The target feature point location difference is a set of location differences between corresponding target feature points of the target areas in the two images.

For example, the target area is a face area. Assuming that there are N face feature points, the target feature point location difference includes N location differences, and each location difference corresponds to one face feature point. A location difference is a location difference between the corresponding target feature points of the target areas in the two images, for example, a location difference between a feature point i of the target area in the reference image and a feature point i of the target area in the current image.

It may be understood that the same target includes the same target feature point. Generally, the target feature point does not change as the target moves, but a location of the target feature point changes. For example, the target is a face, face feature points do not change as the face moves, but locations of the face feature points change. Then, a frame of image that is processed before a current image and includes a target area may be used as a reference image, and a target feature point location difference between the current image and the reference image may be obtained according to an image feature difference between the current image and the reference image.

For example, the computer device may input the image feature difference between a target area in the reference image and a target area in the current image to a feature point location difference determining model, process the inputted image feature difference by using the feature point location difference determining model, and then obtain the target feature point location difference outputted by the feature point location difference determining model.

In an embodiment, the image feature difference is an image pixel difference, and the second image feature extraction model and the feature point location difference determining model may be implemented by using an ML model. In this way, an input to the ML model is an image pixel difference between target areas in two images, and an output is a target feature point location difference between the target areas in the two images.

S208. Position a target feature point in the target area in the current image according to a target feature point location of the target area in the reference image and the target feature point location difference.

The target feature point location is location information of a target feature point in an image, for example, the target feature point location may be coordinate information representing a feature point pixel location. When there are a plurality of target feature points, the target feature point location may be a coordinate information set of a plurality of feature point pixel locations.

For example, the target area is a face area and is a two-dimensional area, and there are N face feature points. In this way, location information of an $i^{th}$ feature point of the face area may be (Xi, Yi), and a face feature point location of the face area is {(X1, Y1), (X2, Y2), . . . , (Xi, Yi), . . . , (XN, YN)}. Certainly, the target area may alternatively be a three-dimensional area, and the location information of the $i^{th}$ feature point of the face area may be (Xi, Yi, Zi).

For example, after obtaining the target feature point location difference between the target area in the reference image and the target area in the current image, the computer device may query a target feature point location of the target area in the reference image, then add the target feature point location of the target area in the reference image and the obtained target feature point location difference, or subtract the obtained target feature point location difference from the target feature point location of the target area in the reference image, to obtain a target feature point location of the target area of the current image, so that a target feature point may be positioned in the target area of the current image.

It may be understood that, if an image feature difference of the obtained target feature point location difference is obtained by subtracting an image feature of the target area in the current image from an image feature of the target area in the reference image, the target feature point location difference may also be considered as being obtained by subtracting the target feature point location of the target area in the current image from the target feature point location of the target area in the reference image, that is, the target feature point location of the target area in the current image is obtained by subtracting the target feature point location difference from the target feature point location of the target area in the reference image. If an image feature difference of the obtained target feature point location difference is obtained by subtracting an image feature of the target area in the reference image from an image feature of the target area in the current image, the target feature point location difference may also be considered as being obtained by subtracting the target feature point location of the target area in the reference image from the target feature point location of the target area in the current image, that is, the target feature point location of the target area of the current image is obtained by adding the target feature point location of the target area in the reference image and the target feature point location difference.

For example, if the target feature point location difference between the target area in the reference image and the target area in the current image is {(x1, y1), (x2, y2), . . . , (xi, yi), . . . , (xN, yN)}, and the target feature point location of the target area in the reference image is {(X1, Y1), (X2, Y2), . . . , (Xi, Yi), . . . , (XN, YN), the target feature point location of the target area in the current image may be {(X1+/−x1, Y1+/−y1), (X2+/−x2, Y2+/−y2), . . . , (Xi+/−xi, Yi+/−yi), . . . , (XN+/−xN, YN+/−yN)}.

In an embodiment, the feature point positioning method further includes: adding an additional element to the current image according to the target feature point positioned in the target area of the current image.

For example, after a feature point is positioned in the target area, subsequent application may be performed by using the positioned feature point. For example, an additional element is added to an image according to the positioned feature point. In another example, feature point positioning of a face area may be used for expression recognition and the like. After the expression recognition, the additional element corresponding to an expression may be further added to the image. Feature point positioning of a hand area may be used for gesture recognition and the like. After the gesture recognition, the additional element corresponding to a gesture may be further added to the image.

The additional element includes data used for being additionally added to an image frame. The additional element may be a decoration element, for example, a pendant. The decoration element includes data that is used for decoration and that can be displayed in a visual form. The additional element includes data displayed in the image to decorate image content. The additional element may be, for example, a mask, armor, a colored ribbon, blue sky, or white cloud. The type of the additional element is not limited in this embodiment of this application. The additional element may be dynamic data, for example, a dynamic (animated) picture; or may be static data, for example, a static picture.

Figure 4:
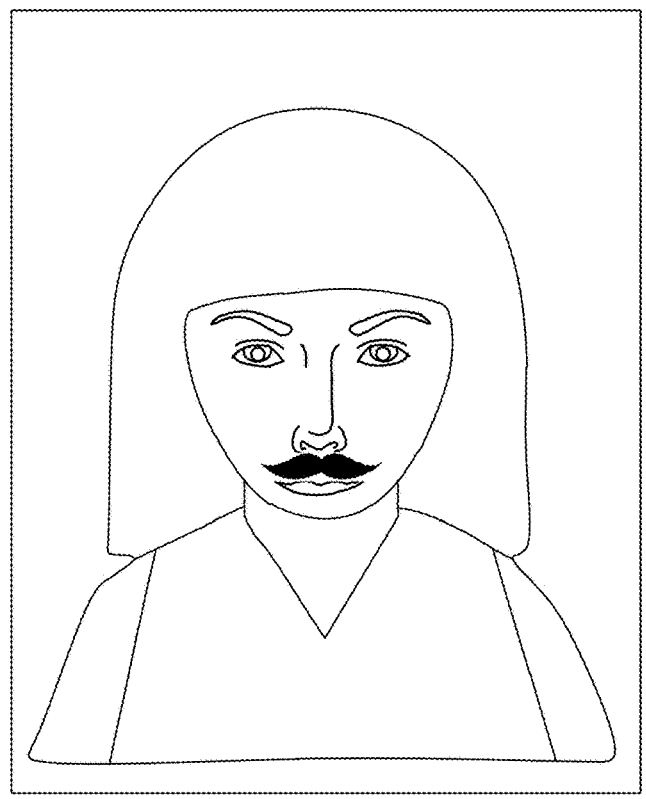
FIG. 4 is a schematic diagram of adding an additional element to an image according to an embodiment.

FIG. 4 is a schematic diagram of adding an additional element to an image according to an embodiment. In this embodiment, the target area is a face area and the target feature point is a face key point. After positioning a face feature point in a current image, the computer device may determine a mouth location according to a mouth key point, and add a beard to the location. For the process, reference may be made to FIG. 4.

In this embodiment, after a target feature point is positioned in the image, an additional element is added according to the positioned feature point, thereby enriching image content and improving accuracy of adding the additional element.

In the feature point positioning method, after a target area is positioned in a current image, an image feature difference between a target area in a reference image and the target area in the current image is determined. In this way, a target feature point location difference between the target area in the reference image and the target area in the current image may be determined by using a feature point location difference determining model and the image feature difference. Because the reference image is a frame of image processed before the current image, a target feature point may be positioned in the target area in the current image with reference to a target feature point location of the target area in the reference image and the foregoing obtained target feature point location difference. In this way, when the target feature point is to be positioned for the current image, the feature point positioning is performed with reference to image information of a previously processed image and according to a target feature point difference between images, thereby improving accuracy of feature point positioning. In addition, compared with a case that a feature point is positioned only according to the current image, by repeatedly using the image information of the previously processed image, sudden location change of the same feature point between different frames of images may be smoothed, thereby avoiding occurrence of jitter of a feature point to a great extent.

In an embodiment, the target area may be a face area and the target feature point is a face feature point. The feature point positioning method further includes: obtaining an image according to a time sequence; detecting a face area in the obtained image; determining the image in which the face area is detected as the reference image when the face area is detected in the obtained image; and using a following image as the current image after the reference image is determined.

To obtain an image according to a time sequence, one approach may be obtaining an image according to an image acquisition time sequence. Another approach may be obtaining a video frame included in a video according to an order of video frames included in the video. The face area may be a face area of a natural person, a virtual object, an animal, or the like.

For example, each time obtaining a frame of image, the computer device attempts to detect a face area in the obtained image. If the computer device has not detected the face area in the image, the computer device ends processing of the image and continues to obtain a next frame of image for performing face area detection. Otherwise, if the computer device has detected the face area in the image, the computer device determines the image as a reference image, and then processes the reference image according to a preset processing manner. The processing manner of the reference image is described in subsequent embodiments. Further, after determining the reference image, the computer device uses subsequently obtained image as a current image, and performs steps of S202 to S208 in the foregoing embodiments on the current image.

It may be understood that, in this embodiment of this application, when performing feature point positioning on a series of images, the computer device first performs face area detection on the images to determine a reference image, and does not perform subsequent processing on the images when the reference image is not determined. After determining the reference image, the computer device processes the reference image according to the processing manner of the reference image and performs steps of S202 to S208 in the foregoing embodiments on an image obtained after the reference image. That is, the computer device processes the reference image and a non-reference image according to different processing manners.

In this embodiment, the reference image is the first frame of image including a face area. In this way, for each current image, an image feature difference used for positioning a feature point is a feature difference between the current image and the first frame of image including the face area, so that error accumulation may be avoided, thereby improving accuracy of feature point positioning.

In an embodiment, the feature point positioning method further includes: querying a reference image replacement condition; and using the current obtained image as a new reference image when the reference image replacement condition is met.

The reference image replacement condition is a constraint condition that needs to be met when a reference image is replaced. That is, a reference image replacement operation is performed only when the constraint condition of the reference image replacement condition is met. The reference image replacement condition may be a constraint condition of a processing time in image processing, or may be a constraint condition of a quantity of images processed in image processing, or the like.

For example, after determining the first reference image, the computer device may continue to obtain an image according to a time sequence, and detect whether a current node reaches a preset node. When detecting that the current node reaches the preset node, the computer device may determine that the current node meets the reference image replacement condition, and then use a current image obtained as a new reference image when the reference image replacement condition is met.

The preset node is a node in an image processing process which is pre-determined. The preset node may be a time node in the image processing process, or a quantity node in the image processing process, for example, an $N^{th}$ second after image processing is started or an $N^{th}$ frame of image processed after image processing is started. The preset node may be a node dynamically determined according to a user operation, or a node uniformly set by the computer device. There may be one or more preset nodes. When there are a plurality of preset nodes, a time interval or a quantity interval between any two adjacent preset nodes in sequence may be the same or different. For example, the interval may be incremented or decremented by a preset value at each node.

In this embodiment, a reference image is flexibly replaced by setting a reference image replacement condition. When there are a relatively large quantity of processed images, an error possibly caused by calculating an image feature difference uniformly by using the first frame of image including the face area is avoided, thereby reducing an accumulated error and improving a processing capability of a model when training data is limited.

In an embodiment, the feature point positioning method further includes: positioning the face area in the reference image; capturing a reference face image according to the face area positioned in the reference image; inputting the reference face image to a first image feature extraction model; obtaining a reference image feature outputted by the first image feature extraction model; and using the reference image feature as an input to a feature point positioning model, to obtain a face feature point location of the reference image, that is, a target feature point location of the target area in the reference image.

The first image feature extraction model includes an ML model that is trained in advance and used for performing image feature extraction according to a single frame of face image. The feature point positioning model includes an ML model that is trained in advance and used for positioning a feature point according to an image feature of a single frame of image. Similarly, the first image feature extraction model and the feature point positioning model may also include a complex network model formed by interconnecting a plurality of layers. For description of the network model, reference may be made to the description in the foregoing embodiments. Details are not described herein again.

It may be understood that the first image feature extraction model herein and the single-frame image feature extraction model in the foregoing embodiment may be the same ML model. An input to the ML model may be a face image captured directly from an image according to a positioned face area, or may be an image pixel feature of a face area in an image. A type of input data when using the model may be the same type of input data selected when training the model.

In an embodiment, the feature point positioning method further includes: determining a first confidence level of the reference face image by using a first target determining model and the reference image feature; when the first confidence level reaches a first preset confidence level threshold, using the reference image feature as the input to the feature point positioning model, to obtain the target feature point location of the target area in the reference image.

The first target determining model includes an ML model that is trained in advance and used for performing face image determining according to an image feature. Similarly, the first target determining model may also include a complex network model formed by interconnecting a plurality of layers. For description of the network model, reference may be made to the description in the foregoing embodiments. Details are not described herein again. In addition, the first target determining model may further include a classification layer and output a classification determining result and/or a confidence level through the classification layer.

The confidence level indicates a degree of credibility at which an input image is a face image. A higher confidence level indicates a higher probability that the input image is the face image. It may be understood that both the first confidence level herein and a second confidence level in subsequent embodiments are identification confidence levels but correspond to different target determining models and different input data.

For example, after determining a reference image, the computer device positions a face area in the reference image, and captures a reference face image according to the face area positioned in the reference image. Then, the computer device inputs the reference face image into a first image feature extraction model, obtains a reference image feature outputted by the first image feature extraction model, and then inputs the reference image feature outputted by the first image feature extraction model into a first target determining model. When a first confidence level outputted by the first target determining model reaches a first preset confidence level threshold, that is, it is further determined that the reference image includes the face area and it is necessary to perform face feature point positioning, the reference image feature outputted by the first image feature extraction model is inputted into a feature point positioning model, and a face feature point location of the reference face image is outputted by the feature point positioning model. When a first confidence level outputted by the first target determining model does not reach a first preset confidence level threshold, that is, it is determined that the reference image does not include the face area and it is unnecessary to perform face feature point positioning, face feature point tracking and positioning ends. In one implementation, the first preset confidence level threshold may be 0.5. Other first preset confidence level thresholds are also contemplated.

Alternatively, the reference image feature outputted by the first image feature extraction model may be inputted into the feature point positioning model and the first target determining model at the same time. In this case, when the first confidence level outputted by the first target determining model reaches the first preset confidence level threshold, that is, it is further determined that the reference image includes the face area, the steps of S202 to S208 in the foregoing embodiments may be performed on subsequently obtained images. When the first confidence level outputted by the first target determining model does not reach the first preset confidence level threshold, that is, it is determined that the reference image does not include the face area, the reference image needs to be re-determined.

In an embodiment, the feature point positioning method further includes: training the first image feature extraction model, the feature point positioning model, and the first target determining model.

For example, the computer device may collect an image sample including a face area, capture a face image sample from the image sample as model training input data, mark a face feature point in the face image sample as a model training label, and train the first image feature extraction model and the feature point positioning model. Then, the computer device uses the face image sample as a positive sample and a non-face image sample as a negative sample to train the first target determining model. When the first image feature extraction model and the feature point positioning model are trained, a model parameter of the first target determining model remains unchanged, and when the first target determining model is trained, model parameters of the first image feature extraction model and the feature point positioning model remain unchanged.

Figure 5:
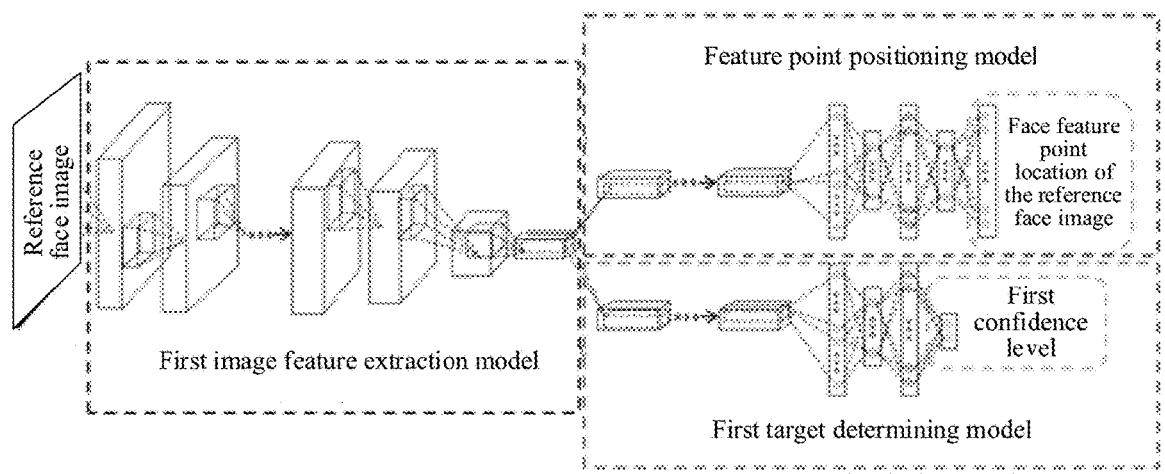
FIG. 5 is a schematic diagram of a connection between models in a feature point positioning method according to an embodiment.

FIG. 5 is a schematic diagram of a connection between models in a feature point positioning method according to an embodiment. As shown in FIG. 5, the schematic diagram includes a first image feature extraction model, a feature point positioning model, and a first target determining model. The feature point positioning model and the first target determining model are separately cascaded with the first image feature extraction model, and the models shown in the figure are used for processing a reference image. For using and training processes of the models shown in FIG. 5, reference may be made to the descriptions in the foregoing embodiments. It may be understood that, internal structures of the models shown in FIG. 5 are only used as an example for description, and the internal structures of the models in the embodiments of this application are not limited. Internal structures of models in other implementations may include more or fewer layers than those shown in FIG. 5.

In the foregoing embodiments, a method dedicated to positioning a feature point in a reference image is provided. when the first confidence level does not reach the first preset confidence level threshold, the feature point may not be positioned using the feature point positioning model, and another model may need to be used, to ensure that the feature point in the reference image can be smoothly positioned.

In an embodiment, the feature point positioning method further includes: determining a second confidence level of the target area by using a second target determining model and the image feature difference; determining a target feature point location difference between the target area in the reference image and the target area in the current image by using a feature point location difference determining model and the image feature difference when the second confidence level reaches a second preset confidence level threshold; and optionally ending target feature point tracking and positioning when the second confidence level does not reach the second preset confidence level threshold.

The second target determining model includes an ML model that is trained in advance and that is used for performing target determining according to an image feature difference between two images. Similarly, the second target determining model may also include a complex network model formed by interconnecting a plurality of layers. For description of the network model, reference may be made to the description in the foregoing embodiment. Details are not described herein again. In addition, the second target determining model may further include a classification layer and output a classification determining result and/or a confidence level through the classification layer.

For example, after determining an image feature difference between a target area in a reference image and a target area in a current image, the computer device inputs the image feature difference into the second target determining model. When a second confidence level outputted by the second target determining model reaches a second preset confidence level threshold, that is, it is further determined that the current image includes the target area and it is necessary to perform target feature point positioning, the image feature difference is inputted into a feature point location difference determining model, and a target feature point location difference is outputted by the feature point location difference determining model, to subsequently position the target feature point in the current image. When a second confidence level outputted by the second target determining model does not reach a second preset confidence level threshold, that is, it is determined that the current image does not include the target area and it is unnecessary to perform target feature point tracking and positioning, target feature point tracking and positioning ends. For example, in one implementation, the second preset confidence level threshold may be 0.5. Other second preset confidence level thresholds are also contemplated.

The image feature difference may be obtained by using a second image feature extraction model. The computer device may determine an image pixel difference between a target area in a reference image and a target area in a current image, and input the image pixel difference into the second image feature extraction model, to output an image feature difference as inputs of the feature point location difference determining model and the second target determining model.

Figure 6:
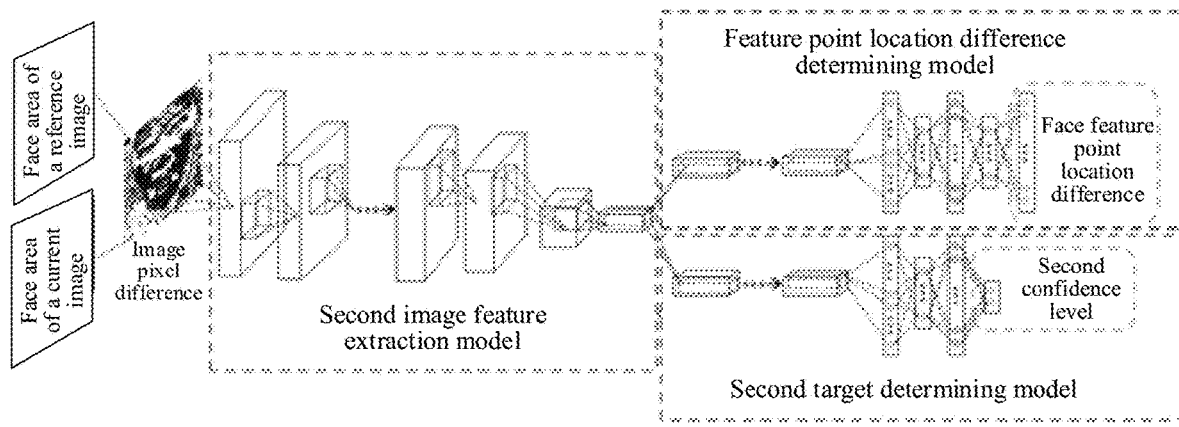
FIG. 6 is a schematic diagram of a connection between models in a feature point positioning method according to another embodiment.

FIG. 6 is a schematic diagram of a connection between models in a feature point positioning method according to an embodiment. As shown in FIG. 6, the schematic diagram includes a second image feature extraction model, a feature point location difference determining model, and a second target determining model, the feature point location difference determining model and the second target determining model are separately cascaded with the second image feature extraction model, and the models shown in the figure are used for processing a non-reference image. For use and training processes of the models shown in FIG. 6, reference may be made to the descriptions in the foregoing or following embodiments. It may be understood that, internal structures of the models shown in FIG. 6 are only used as an example for description, and the internal structures of the models in the embodiments of this application are not limited. Internal structures of models in an actual scenario may include more or fewer layers than those shown in FIG. 6.

In this embodiment, after the image feature difference is obtained, whether the current image includes the target area is first determined again by using the second target determining model, and the target feature point positioning is performed on the target area only when it is determined again that the current image includes the target area, to avoid a waste of computing resources.

Figure 7:
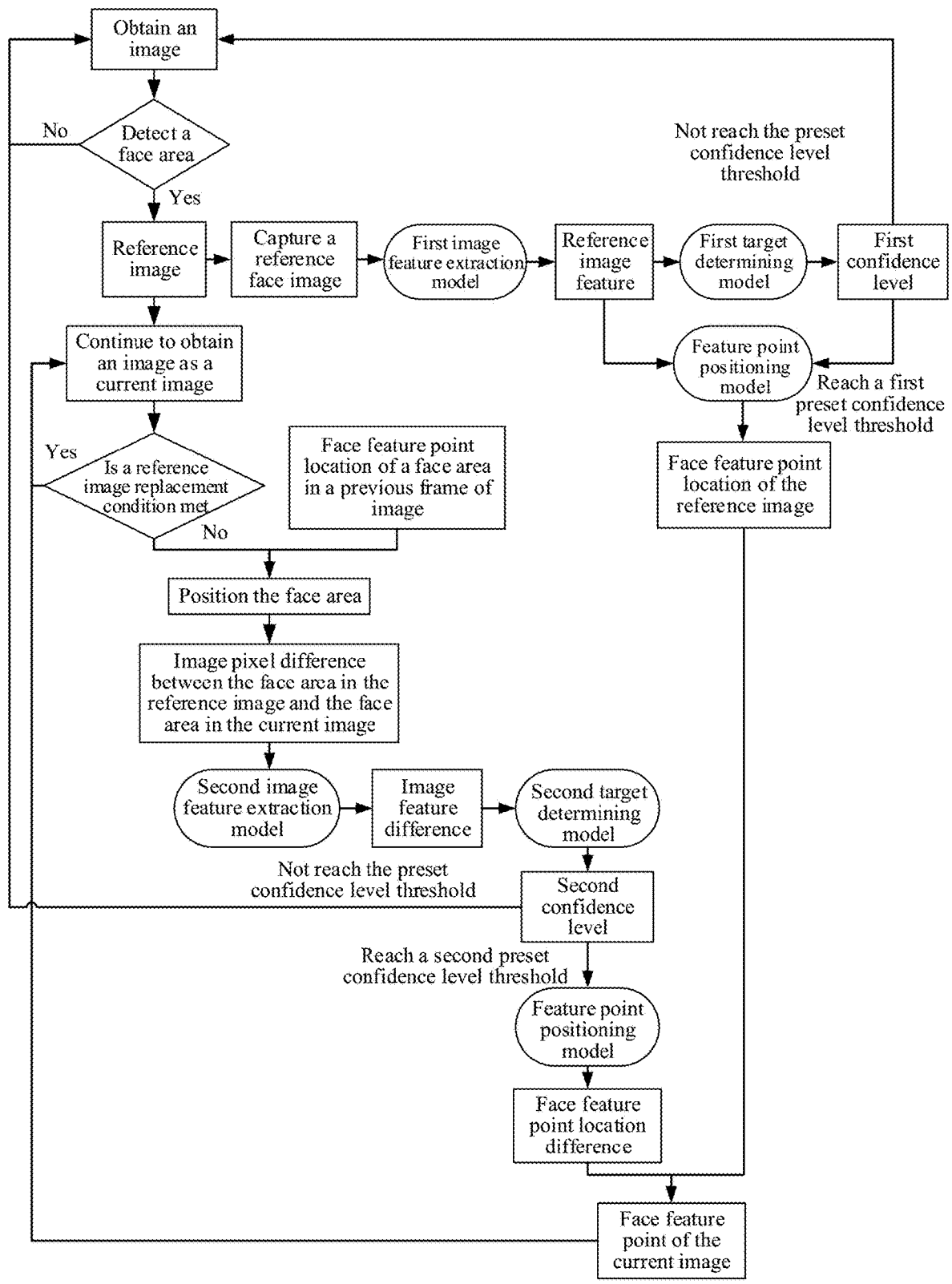
FIG. 7 is a schematic flowchart of a feature point positioning process according to an embodiment.

FIG. 7 is a schematic flowchart of a feature point positioning process according to an embodiment. In this embodiment, the computer device is a terminal, the target area is a face area, and the target feature point is a face feature point. Referring to FIG. 7, the terminal acquires an image through a built-in or externally connected camera according to an acquisition time sequence. In this way, each time obtaining a frame of image, the terminal detects a face area in the obtained image. If the terminal has not detected the face area in the obtained image, the terminal continues to obtain a next frame of image for performing face area detection. If the terminal has detected the face area in the obtained image, the terminal determines the image in which the face area is detected as a reference image.

After determining the reference image, the terminal may position a face area in the reference image, capture a reference face image according to the face area positioned in the reference image, and input the reference face image into a first image feature extraction model. The terminal may continue to input a reference image feature outputted by the first image feature extraction model into a first target determining model, and output, by using the first target determining model, a first confidence level at which the reference image includes the face area.

When the first confidence level reaches a first preset confidence level threshold, the reference image feature outputted by the first image feature extraction model is inputted into a feature point positioning model, and a face feature point location of the reference image is outputted by the feature point positioning model and recorded for subsequent use. When the first confidence level does not reach the first preset confidence level threshold, face feature point tracking and positioning ends, and a next frame of image continues to be obtained to perform face area detection, to re-determine a reference image.

After determining the reference image, the terminal continues to obtain a next frame of image as a current image, and queries a face feature point location of a face area in a previous frame of image of the current image; determines a face preselection area in the current image according to the queried face feature point location; and expands the face preselection area in the current image according to a preset multiple, to obtain a face area. The terminal subsequently calculates an image pixel difference between the face area in the reference image and the face area in the current image, and inputs the image pixel difference into a second image feature extraction model.

Then, the terminal may input an image feature difference outputted by the second image feature extraction model into a second target determining model, and output, by using the second target determining model, a second confidence level at which the current image includes the face area. When the second confidence level reaches a second preset confidence level threshold, the image feature difference outputted by the second image feature extraction model is inputted into a feature point location difference determining model, and a face feature point location difference between the reference image and the current image is outputted by using the feature point location difference determining model. When the second confidence level does not reach the second preset confidence level threshold, face feature point tracking and positioning ends, and a next frame of image continues to be obtained to perform face area detection, to re-determine a reference image.

After obtaining the face feature point location difference between the reference image and the current image, the terminal queries a pre-recorded face feature point location of the reference image, to position a face feature point in the face area of the current image. In this way, the terminal may add an additional element to the current image according to the face feature point positioned in the face area of the current image, and continue to obtain a next frame of image as a current image to process the current image.

When continuing to obtain the image as the current image to process the current image, the terminal may query a reference image replacement condition; and use a current image obtained as a new reference image when the reference image replacement condition is met, and update/record the face feature point location of the newly updated reference image for subsequent use.

In an embodiment, the feature point positioning method further includes: obtaining training sample images; positioning a sample target area in each training sample image; determining a sample target feature point location in the sample target area of the each training sample image; determining a sample target feature point location difference between every two of the training sample images; and using a sample image feature difference between sample target areas in any two training sample images as model training input data, and using a sample target feature point location difference between the any two training sample images as a training label, to train the feature point location difference determining model.

The training sample image is an image from which the model training data is derived. When an image includes a target, the image may be selected as the training sample image. The sample target area is an area containing the sample.

For example, the computer device may collect a plurality of images including a target as training sample images, then position sample target areas in the training sample images, and determine sample target feature point locations in the sample target areas of the training sample images, to determine a sample target feature point location difference between every two of the training sample images. In this way, image information of the plurality of images is considered when a feature point is positioned. The computer device may use a sample image feature difference between sample target areas in any two training sample images as model training input data, and use a sample target feature point location difference between the any two training sample images as a training label, to train the feature point location difference determining model.

In an embodiment, targets in two training sample images from which a sample target feature point location difference is derived belong to the same object. For example, if a target is a face, faces in the two training sample images belong to the same object such as the same natural person.

The sample image feature difference between the sample target areas in the any two training sample images may be obtained by using the ML model, or may be obtained through calculation after the computer device extracts sample image features respectively from the sample target areas in the any two training sample images by using a feature extraction algorithm. For example, when the target area is a face area, the computer device may extract a face feature by using a face feature extraction algorithm. The face feature may be a Haar feature, or the like.

In an embodiment, the using a sample image feature difference between sample target areas in any two training sample images as model training input data, and using a sample target feature point location difference between the any two training sample images as a training label, to train the feature point location difference determining model includes: using a sample image pixel difference between the sample target areas in the any two training sample images as model training input data of a second image feature extraction model; using an output of the second image feature extraction model as an input to the feature point location difference determining model, the output of the second image feature extraction model being the sample image feature difference between the sample target areas in the any two training sample images; and using the sample target feature point location difference between the any two training sample images as the training label, to train the second image feature extraction model and the feature point location difference determining model.

For example, the second image feature extraction model and the feature point location difference determining model may be trained together, and the output of the second image feature extraction model is the input to the feature point location difference determining model. To use image information of the plurality of images when a feature point is positioned, the computer device may use a sample image pixel difference between sample target areas in any two training sample images as an input to the second image feature extraction model; and use a sample target feature point location difference between the any two training sample images as an expected output of the feature point location difference determining model. A process of training the second image feature extraction model and the feature point location difference determining model is a process of minimizing a difference between an actual output of the feature point location difference determining model and the expected output.

When the second image feature extraction model and the feature point location difference determining model are trained, L1 is used as a loss function, and L1 may be a Euclidean loss function. The formula is as follows:

$$L1 = \frac{1}{2N}\sum_{i=1}^{N} \|\hat{y}_i - y_i\|_2^2 \quad (1)$$

where $\hat{y}_i$ represents an expected output (a model training label), $y_i$ represents an actual output, N represents a quantity of samples. A smaller loss value of the loss function indicates higher accuracy of an output result of the model. The second image feature extraction model and the feature point location difference determining model are trained, that is, model parameters of the second image feature extraction model and the feature point location difference determining model are adjusted, to minimize L1.

In an embodiment, the feature point positioning method further includes: using the sample image pixel difference between the sample target areas in the any two training sample images as positive sample data; using a sample image pixel difference between a sample target area in the training sample image and a non-sample target area image as negative sample data; and training the second target determining model according to the positive sample data and the negative sample data.

A non-sample target area image may be a sample image that does not include the sample target area. In this embodiment, the sample image pixel difference between the sample target areas in the any two training sample images is used as the positive sample data, and the sample image pixel difference between the sample target area in the training sample image and the non-sample target area image is used as the negative sample data, to train the second target determining model. When training the second target determining model, the model parameters of the second image feature extraction model and the feature point location difference determining model are fixed. Similarly, when training the second image feature extraction model and the feature point location difference determining model, the model parameter of the second target determining model is also fixed.

When the second target determining model is trained, L2 is used as a loss function, and L2 may be a normalized log loss function (e.g., Softmax Loss). The formula is as follows:

$$L2 = -\Sigma_{j=i}^{T} \log s_j \qquad (2)$$

where T represents a quantity of preset predicted classifications, and $s_j$ represents a probability of belonging to a $j^{th}$ preset predicted classification. A smaller loss value of the loss function indicates higher accuracy of an output result of the second target determining model. In this embodiment, the second target determining model is a binary classification model. The second target determining model is trained, that is, the model parameter of the second target determining model is adjusted, to minimize L2.

In an embodiment, the target area is a face area and the target feature point includes a face feature point. The computer device may obtain a plurality of frames of face images of a plurality of objects. Coordinates of face key points are marked in the face images. In this way, the computer device may obtain a plurality of groups of data $(I_j^i, X_j^i)$ of each object. $I_j^i$ is an image pixel feature of a $j^{th}$ frame of face image of an $i^{th}$ object, and $X_j^i$ is a face feature point location of the $j^{th}$ frame of face image of the $i^{th}$ object.

The computer device may perform random pairing for the data $(I_j^i, X_j^i)$ of the each of the plurality of object, to generate an image pixel difference $I_{j0}^i - I_{j1}^i$ as model training input data of the second image feature extraction model, and use a corresponding face feature point location difference $X_{j0}^i - X_{j1}^i$ as an expected output of the feature point location difference determining model, to train the second image feature extraction model and the feature point location difference determining model. In this step, the model parameter of the second target determining model remains unchanged.

Further, the computer device then uses the image pixel difference $I_{j0}^i - I_{j1}^i$ generated through random pairing as positive sample model training input data of the second image feature extraction model, and uses $I_{j0}^i - M$ as negative sample model training input data of the second image feature extraction model, to train the second target determining model. M is an image pixel feature of a non-face area. In this step, the model parameters of the second image feature extraction model and the feature point location difference determining model remain unchanged.

In the foregoing embodiments, model training is performed by using an image pixel difference between two images as model training input data instead of only depending on a single frame of image. A target feature point location difference between two images is used as a training label, so that a model learns to obtain intended data from image information of the two images. In this way, when the target feature point is positioned for the current image by using a trained model, final feature point positioning is performed with reference to image information of a previously processed image and according to a target feature point difference between images, thereby improving accuracy of feature point positioning. In addition, compared with a case that a feature point is positioned only according to the current image, by repeatedly using the image information of the previously processed image, sudden location change of the same feature point between different frames of images can be smoothed, thereby avoiding jitter of a feature point to a great extent.

It is to be understood that, although the steps in the flowcharts of the foregoing embodiments are sequentially shown according to the indication of arrows, the steps are not necessarily sequentially performed according to the sequence indicated by the arrows. Unless explicitly specified in this application, the sequence of the steps is not strictly limited, and the steps may be performed in other sequences. Moreover, at least some of the steps in the foregoing embodiments may include a plurality of sub-steps or a plurality of stages. The sub-steps or stages are not necessarily performed at the same moment but may be performed at different moments. The sub-steps or stages are not necessarily performed sequentially, but may be performed in turn or alternately with other steps or at least some sub-steps or stages of other steps.

Figure 8:
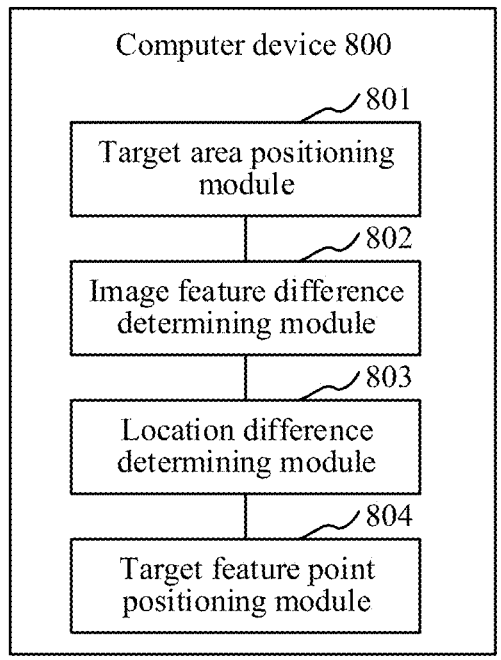
FIG. 8 is a structural diagram of modules of a computer device according to an embodiment.

As shown in FIG. 8, in an embodiment, a computer device 800 is provided. Referring to FIG. 8, the computer device 800 includes: a target area positioning module 801, an image feature difference determining module 802, a location difference determining module 803, and a target feature point positioning module 804.

The target area positioning module 801 is configured to position a target area in a current image.

The image feature difference determining module 802 is configured to determine an image feature difference between a target area in a reference image and the target area in the current image, the reference image being a frame of image that is processed before the current image and includes the target area.

The location difference determining module 803 is configured to determine a target feature point location difference between the target area in the reference image and the target area in the current image by using a feature point location difference determining model and the image feature difference.

The target feature point positioning module 804 is configured to position a target feature point in the target area in the current image according to a target feature point location of the target area in the reference image and the target feature point location difference.

In an embodiment, the target area is a face area and the target feature point is a face feature point. The computer device 800 further includes: a reference image processing module 805, configured to obtain an image according to a time sequence; detect a face area in the obtained image; determine the obtained image as the reference image when the face area is detected in the obtained image; and use, after the reference image is determined, a subsequently obtained image as the current image.

In an embodiment, the reference image processing module 805 is further configured to query a reference image replacement condition; and use, in a case that the image that continues to be obtained is used as the current image, the current image obtained in a case that the reference image replacement condition is met as a new reference image.

In an embodiment, the reference image processing module 805 is further configured to position the face area in the reference image; capture a reference face image according to the face area positioned in the reference image; input the reference face image into a first image feature extraction model; obtain a reference image feature outputted by the first image feature extraction model; and use the reference image feature as an input to a feature point positioning model, to obtain a target feature point location of the target area in the reference image.

In an embodiment, the reference image processing module 805 is further configured to determine a first confidence level of the reference face image by using a first target determining model and the reference image feature; use the reference image feature as an input to a feature point positioning model, to obtain the target feature point location of the target area in the reference image when the first confidence level reaches a first preset confidence level threshold; and optionally end face feature point tracking and positioning when the first confidence level does not reach the first preset confidence level threshold.

In an embodiment, the target area positioning module 801 is further configured to query a target feature point location of a target area in a previous frame of image of the current image; determine a target preselection area in the current image according to the queried target feature point location of the target area in the previous frame of image; and expand the target preselection area in the current image according to a preset multiple, to obtain the target area in the current image.

In an embodiment, the image feature difference determining module 802 is further configured to calculate an image pixel difference between the target area in the reference image and the target area in the current image; input the image pixel difference into a second image feature extraction model; and obtain the image feature difference outputted by the second image feature extraction model.

In an embodiment, the location difference determining module 803 is further configured to determine a second confidence level of the target area by using a second target determining model and the image feature difference; determine a target feature point location difference between the target area in the reference image and the target area in the current image by using a feature point location difference determining model and the image feature difference when the second confidence level reaches a second preset confidence level threshold; and optionally end target feature point tracking and positioning when the second confidence level does not reach the second preset confidence level threshold.

Figure 9:
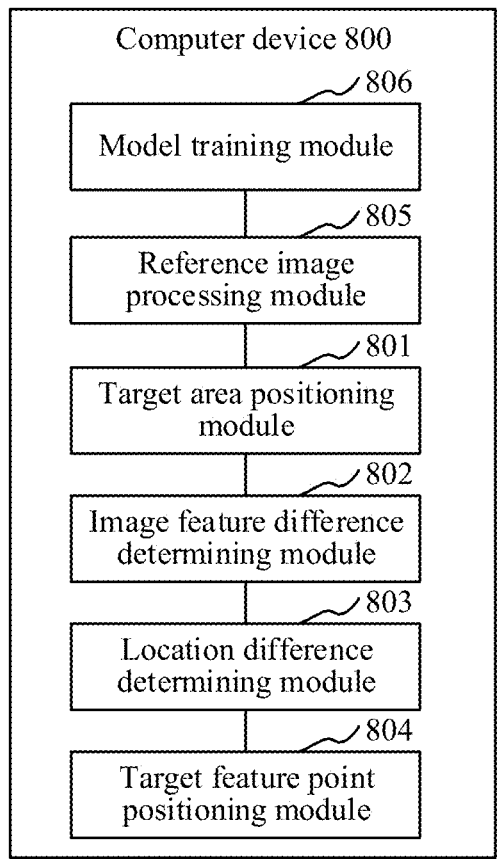
FIG. 9 is a structural diagram of modules of a computer device according to another embodiment.

As shown in FIG. 9, in an embodiment, the computer device 800 further includes a reference image processing module 805 and a model training module 806.

The model training module 806 is configured to obtain training sample images; position a sample target area in each training sample image; determine a sample target feature point location in the sample target area of the each training sample image; determine a sample target feature point location difference between every two of the training sample images; and use a sample image feature difference between sample target areas in any two training sample images as model training input data, and use a sample target feature point location difference between the any two training sample images as a training label, to train the feature point location difference determining model.

In an embodiment, the model training module 806 is further configured to use a sample image pixel difference between the sample target areas in the any two training sample images as model training input data of a second image feature extraction model; use an output of the second image feature extraction model as an input to the feature point location difference determining model, the output of the second image feature extraction model being the sample image feature difference between the sample target areas in the any two training sample images; and use the sample target feature point location difference between the any two training sample images as the training label, to train the second image feature extraction model and the feature point location difference determining model.

In an embodiment, the model training module 806 is further configured to use the sample image pixel difference between the sample target areas in the any two training sample images as positive sample data; use a sample image pixel difference between a sample target area in the training sample image and a non-sample target area image as negative sample data; and train the second target determining model according to the positive sample data and the negative sample data.

In an embodiment, the target feature point positioning module 804 is further configured to add an additional element to the current image according to the target feature point positioned in the target area of the current image.

Figure 10:
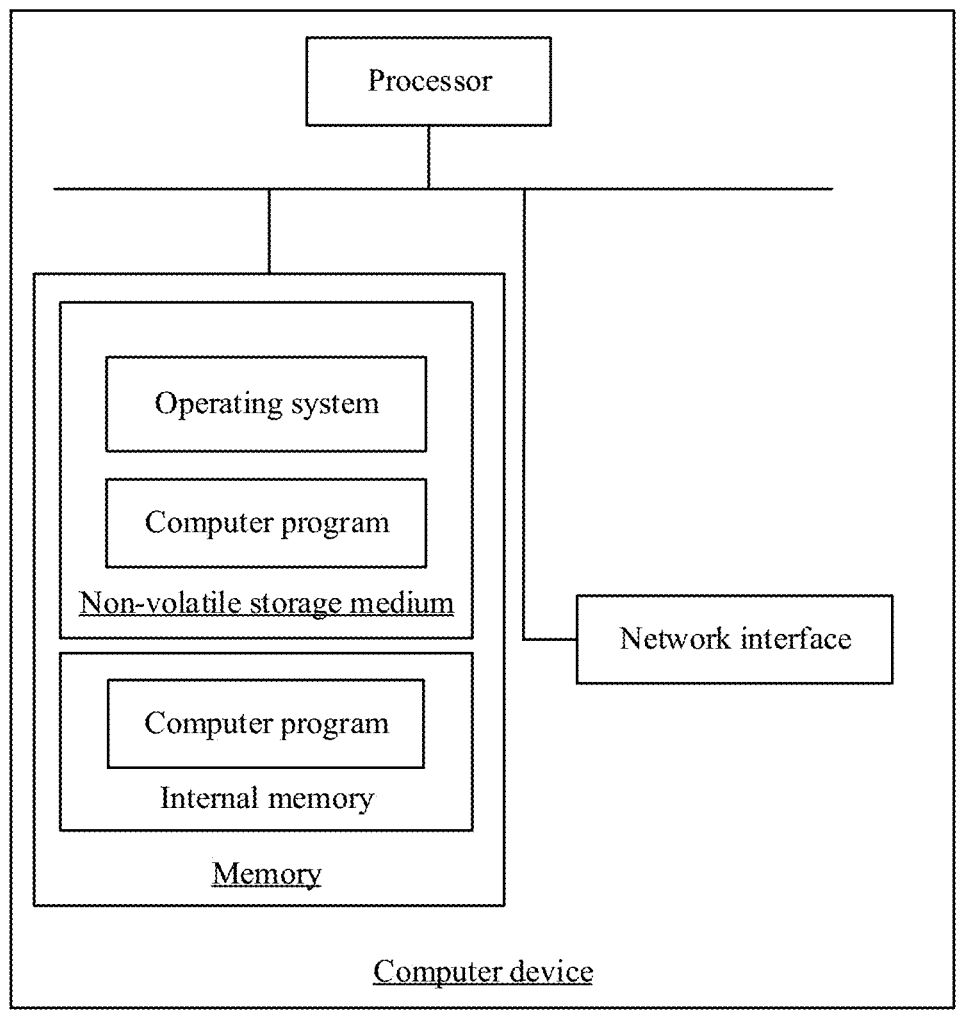
FIG. 10 is a diagram of an internal structure of a computer device according to an embodiment.

FIG. 10 is a diagram of an internal structure of a computer device according to an embodiment. The computer device may be the terminal 110 or the server 120 in FIG. 1. As shown in FIG. 10, the computer device includes a processor, a memory, and a network interface that are connected through a system bus. The memory includes a non-transitory storage medium and an internal memory. The non-transitory storage medium of the computer device stores an operating system and may further store a computer program, the computer program, when executed by the processor, causing the processor to implement the feature point positioning method. The internal memory may also store a computer program, the computer program, when executed by the processor, causing the processor to perform the feature point positioning method. A person skilled in the art may understand that, the structure shown in FIG. 10 is only a block diagram of a partial structure related to the solution in this application, and does not constitute a limitation on the computer device to which the solution of this application is applied. The computer device may include more components or fewer components than those shown in the figure, or some components may be combined, or a different component deployment may be used.

In an embodiment, the computer device provided by this application may be implemented as a device for executing a computer program. The computer program may run on the computer device shown in FIG. 10, and the non-transitory storage medium of the computer device may store program modules such as the target area positioning module 801, the image feature difference determining module 802, the location difference determining module 803, and the target feature point positioning module 804 shown in FIG. 8. A computer program formed by the program modules causes the processor to perform the steps in the feature point positioning method in the embodiments of this application described in this specification.

For example, the computer device shown in FIG. 10 may position a target area in a current image by using the target area positioning module 801 shown in FIG. 8; determine an image feature difference between a target area in a reference image and the target area in the current image by using the image feature difference determining module 802, the reference image being a frame of image that is processed before the current image and that includes the target area; determine a target feature point location difference between the target area in the reference image and the target area in the current image by using a feature point location difference determining model and the image feature difference by using the location difference determining module 803; and position a target feature point in the target area of the current image according to a target feature point location of the target area in the reference image and the target feature point location difference by using the target feature point positioning module 804.

In an embodiment, a non-transitory computer-readable storage medium is provided, the non-transitory computer-readable storage medium stores a computer program, and the computer program, when executed by a processor, causes the processor to perform the following steps: positioning a target area in a current image; determining an image feature difference between a target area in a reference image and the target area in the current image, the reference image being a frame of image that is processed before the current image and that includes the target area; determining a target feature point location difference between the target area in the reference image and the target area in the current image by using a feature point location difference determining model and the image feature difference; and positioning a target feature point in the target area of the current image according to a target feature point location of the target area in the reference image and the target feature point location difference.

In an embodiment, the target area is a face area and the target feature point is a face feature point. The computer program further causes the processor to perform the following steps: obtaining an image according to a time sequence; detecting a face area in the obtained image; determining the obtained image as the reference image when the face area is detected in the obtained image; and using, after the reference image is determined, a subsequently obtained image as the current image.

In an embodiment, the computer program further causes the processor to perform the following steps: querying a reference image replacement condition; and using, in a case that the image that continues to be obtained is used as the current image, the current image obtained in a case that the reference image replacement condition is met as a new reference image.

In an embodiment, the computer program further causes the processor to perform the following steps: positioning the face area in the reference image; capturing a reference face image according to the face area positioned in the reference image; inputting the reference face image into a first image feature extraction model; obtaining a reference image feature outputted by the first image feature extraction model; and using the reference image feature as an input to a feature point positioning model, to obtain a face feature point location of the reference image.

In an embodiment, the computer program further causes the processor to perform the following steps: determining a first confidence level of the reference face image by using a first target determining model and the reference image feature; using the reference image feature as an input to a feature point positioning model, to obtain the face feature point of the reference image when the first confidence level reaches a first preset confidence level threshold; and ending face feature point tracking and positioning when the first confidence level does not reach the first preset confidence level threshold.

In an embodiment, the positioning a target area in a current image includes: querying a target feature point location of a target area in a previous frame of image of the current image; determining a target preselection area in the current image according to the queried target feature point location; and expanding the target preselection area in the current image according to a preset multiple, to obtain the target area.

In an embodiment, the determining an image feature difference between a target area in a reference image and the target area in the current image includes: calculating an image pixel difference between the target area in the reference image and the target area in the current image; inputting the image pixel difference into a second image feature extraction model; and obtaining the image feature difference outputted by the second image feature extraction model.

In an embodiment, the computer program further causes the processor to perform the following steps: determining a second confidence level of the target area by using a second target determining model and the image feature difference; performing the operation of determining a target feature point location difference between the target area in the reference image and the target area in the current image by using a feature point location difference determining model and the image feature difference when the second confidence level reaches a second preset confidence level threshold; and ending target feature point tracking and positioning when the second confidence level does not reach the second preset confidence level threshold.

In an embodiment, the computer program further causes the processor to perform the following steps: obtaining training sample images; positioning a sample target area in each training sample image; determining a sample target feature point location in the sample target area of the each training sample image; determining a sample target feature point location difference between every two of the training sample images; and using a sample image feature difference between sample target areas in any two training sample images as model training input data, and using a sample target feature point location difference between the any two training sample images as a training label, to train the feature point location difference determining model.

In an embodiment, the using a sample image feature difference between sample target areas in any two training sample images as model training input data, and using a sample target feature point location difference between the any two training sample images as a training label, to train the feature point location difference determining model includes: using a sample image pixel difference between the sample target areas in the any two training sample images as model training input data of a second image feature extraction model; using an output of the second image feature extraction model as an input to the feature point location difference determining model, the output of the second image feature extraction model being the sample image feature difference between the sample target areas in the any two training sample images; and using the sample target feature point location difference between the any two training sample images as the training label, to train the second image feature extraction model and the feature point location difference determining model.

In an embodiment, the computer program further causes the processor to perform the following steps: using the sample image pixel difference between the sample target areas in the any two training sample images as positive sample data; using a sample image pixel difference between a sample target area in the training sample image and a non-sample target area image as negative sample data; and training the second target determining model according to the positive sample data and the negative sample data.

In an embodiment, the computer program further causes the processor to perform the following steps: adding an additional element to the current image according to the target feature point positioned in the target area of the current image.

In an embodiment, a computer device is provided, including a memory and a processor, the memory stores a computer program, and the computer program, when executed by the processor, causes the processor to perform the following steps: positioning a target area in a current image; determining an image feature difference between a target area in a reference image and the target area in the current image, the reference image being a frame of image that is processed before the current image and includes the target area; determining a target feature point location difference between the target area in the reference image and the target area in the current image by using a feature point location difference determining model and the image feature difference; and positioning a target feature point in the target area of the current image according to a target feature point location of the target area in the reference image and the target feature point location difference.

In an embodiment, the target area is a face area and the target feature point is a face feature point. The computer program further causes the processor to perform the following steps: obtaining an image according to a time sequence; detecting a face area in the obtained image; determining the obtained image as the reference image when the face area is detected in the obtained image; and using, after the reference image is determined, a subsequently obtained image as the current image.

In an embodiment, the computer program further causes the processor to perform the following steps: querying a reference image replacement condition; and using, in a case that the image that continues to be obtained is used as the current image, the current image obtained in a case that the reference image replacement condition is met as a new reference image.

In an embodiment, the computer program further causes the processor to perform the following steps: positioning the face area in the reference image; capturing a reference face image according to the face area positioned in the reference image; inputting the reference face image into a first image feature extraction model; obtaining a reference image feature outputted by the first image feature extraction model; and using the reference image feature as an input to a feature point positioning model, to obtain a face feature point location of the reference image.

In an embodiment, the computer program further causes the processor to perform the following steps: determining a first confidence level of the reference face image by using a first target determining model and the reference image feature; using the reference image feature as an input to a feature point positioning model, to obtain the face feature point of the reference image when the first confidence level reaches a first preset confidence level threshold; and ending face feature point tracking and positioning when the first confidence level does not reach the first preset confidence level threshold.

In an embodiment, the positioning a target area in a current image includes: querying a target feature point location of a target area in a previous frame of image of the current image; determining a target preselection area in the current image according to the queried target feature point location; and expanding the target preselection area in the current image according to a preset multiple, to obtain the target area.

In an embodiment, the determining an image feature difference between a target area in a reference image and the target area in the current image includes: calculating an image pixel difference between the target area in the reference image and the target area in the current image; inputting the image pixel difference into a second image feature extraction model; and obtaining the image feature difference outputted by the second image feature extraction model.

In an embodiment, the computer program further causes the processor to perform the following steps: determining a second confidence level of the target area by using a second target determining model and the image feature difference; performing the operation of determining a target feature point location difference between the target area in the reference image and the target area in the current image by using a feature point location difference determining model and the image feature difference when the second confidence level reaches a second preset confidence level threshold; and ending target feature point tracking and positioning when the second confidence level does not reach the second preset confidence level threshold.

In an embodiment, the computer program further causes the processor to perform the following steps: obtaining training sample images; positioning a sample target area in each training sample image; determining a sample target feature point location in the sample target area of the each training sample image; determining a sample target feature point location difference between every two of the training sample images; and using a sample image feature difference between sample target areas in any two training sample images as model training input data, and using a sample target feature point location difference between the any two training sample images as a training label, to train the feature point location difference determining model.

In an embodiment, the using a sample image feature difference between sample target areas in any two training sample images as model training input data, and using a sample target feature point location difference between the any two training sample images as a training label, to train the feature point location difference determining model includes: using a sample image pixel difference between the sample target areas in the any two training sample images as model training input data of a second image feature extraction model; using an output of the second image feature extraction model as an input to the feature point location difference determining model, the output of the second image feature extraction model being the sample image feature difference between the sample target areas in the any two training sample images; and using the sample target feature point location difference between the any two training sample images as the training label, to train the second image feature extraction model and the feature point location difference determining model.

In an embodiment, the computer program further causes the processor to perform the following steps: using the sample image pixel difference between the sample target areas in the any two training sample images as positive sample data; using a sample image pixel difference between a sample target area in the training sample image and a non-sample target area image as negative sample data; and training the second target determining model according to the positive sample data and the negative sample data.

In an embodiment, the computer program further causes the processor to perform the following steps: adding an additional element to the current image according to the target feature point positioned in the target area of the current image.

A person of ordinary skill in the art may understand that all or some of the processes in the method of the foregoing embodiments may be implemented and completed by using the computer programs to instruct related hardware. The programs may be stored in a non-transitory computer-readable storage medium, and the programs, when executed, may include the processes of the foregoing method embodiments. Any reference to the memory, storage, a database, or other media used in the embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash. The volatile memory may include a random access memory (RAM) or an external cache. As an illustration instead of a limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), a synchronization link (Synchlink) DRAM (SLDRAM), a rambus direct RAM (RDRAM), a direct rambus dynamic RAM (DRDRAM), and a rambus dynamic RAM (RDRAM).

The technical features in the foregoing embodiments may be randomly combined. To make the description concise, not all possible combinations of the technical features in the foregoing embodiments are described. However, combinations of the technical features shall all be considered as falling within the scope described in this specification provided that the combinations of the technical features do not conflict with each other.

The foregoing embodiments only show several implementations of this application and are described in detail, but they are not to be construed as a limit to the patent scope of this application. A person of ordinary skill in the art may further make variations and improvements without departing from the ideas of this application, which all fall within the protection scope of this application. Therefore, the protection scope of this application is to be subject to the protection scope of the appended claims.

What is claimed is:

1. A method for feature point positioning, performed by a computer device, the method comprising:
   positioning a target area in a current image;
   determining an image feature difference between a target area in a reference image and the target area in the current image, the reference image being a frame of image that is processed before the current image and that comprises the target area;
   determining a target figure point location of the target area in the reference image;
   determining a target feature point location difference between the target area in the reference image and the target area in the current image according to a feature point location difference determining model and the image feature difference; and
   positioning a target feature point in the target area in the current image according to the target feature point location of the target area in the reference image and the target feature point location difference.

2. The method according to claim 1, wherein the target area is a face area, the target feature point comprises a face feature point, and the method further comprises:
   obtaining an image according to a time sequence;
   detecting a face area in the obtained image;
   in response to detecting the face area in the obtained image, determining the obtained image as the reference image; and
   using a subsequently obtained image after the reference image as the current image.

3. The method according to claim 2, further comprising:
   querying a reference image replacement condition; and
   using the current image as a new reference image when the reference image replacement condition is met.

4. The method according to claim 2, wherein determining the target figure point location of the target area in the reference image comprises:
   positioning the face area in the reference image;
   capturing a reference face image according to the face area located in the reference image;
   inputting the reference face image to a first image feature extraction model;
   obtaining a reference image feature outputted by the first image feature extraction model; and
   using the reference image feature as an input to a feature point positioning model to obtain the target feature point location of the target area in the reference image.

5. The method according to claim 4, wherein using the reference image feature as the input to the feature point positioning model to obtain the target feature point location of the target area in the reference image comprises:
   determining a first confidence level of the reference face image according to a first target determining model and the reference image feature; and
   when the first confidence level reaches a first preset confidence level threshold, using the reference image feature as the input to the feature point positioning model, to obtain the target feature point location of the target area in the reference image.

6. The method according to claim 1, wherein positioning the target area in the current image comprises:
   querying a target feature point location of a target area in a previous frame of image of the current image;
   determining a target preselection area in the current image according to the queried target feature point location of the target area in the previous frame of image; and
   expanding the target preselection area in the current image according to a preset multiple, to obtain the target area in the current image.

7. The method according to claim 1, wherein determining the image feature difference between the target area in the reference image and the target area in the current image comprises:
   calculating an image pixel difference between the target area in the reference image and the target area in the current image;
   inputting the image pixel difference to a second image feature extraction model; and
   obtaining the image feature difference outputted by the second image feature extraction model.

8. The method according to claim 7, wherein determining the target feature point location difference comprises:
   determining a second confidence level of the target area in the current image by using a second target determining model and the image feature difference; and
   determining the target feature point location difference between the target area in the reference image and the target area in the current image by according to the feature point location difference determining model and the image feature difference when the second confidence level reaches a second preset confidence level threshold.

9. The method according to claim 1, further comprising:
   obtaining training sample images;

positioning a sample target area in each of the training sample images;

determining a sample target feature point location in the sample target area of the each of the training sample images;

determining a sample target feature point location difference between any two of the training sample images; and using a sample image feature difference between sample target areas in the any two of the training sample images as model training input data, and using a sample target feature point location difference between the any two of the training sample images as a training label, to train the feature point location difference determining model.

10. The method according to claim 9, wherein using the sample image feature difference between sample target areas in the any two of the training sample images as model training input data, and using a sample target feature point location difference between the any two of the training sample images as a training label, to train the feature point location difference determining model comprises:

using a sample image pixel difference between the sample target areas in the any two of the training sample images as model training input data of a second image feature extraction model;

using an output of the second image feature extraction model as an input to the feature point location difference determining model, the output of the second image feature extraction model being the sample image feature difference between the sample target areas in the any two of the training sample images; and using the sample target feature point location difference between the any two of the training sample images as the training label, to train the second image feature extraction model and the feature point location difference determining model.

11. The method according to claim 10, further comprising:

using the sample image pixel difference between the sample target areas in the any two of the training sample images as positive sample data;

using a sample image pixel difference between a sample target area in the each of the training sample images and a non-sample target area image as negative sample data; and training a second target determining model according to the positive sample data and the negative sample data, wherein the second target determining model is used for determining a second confidence level of an image indicating whether the image includes a specific target area.

12. The method according to claim 1, further comprising:

adding an additional element to the current image according to the target feature point positioned in the target area in the current image.

13. An apparatus for feature point positioning, comprising a memory for storing computer instructions and a processor in communication with the memory, wherein, when the processor executes the computer instructions, the processor is configured to cause the apparatus to:

position a target area in a current image;

determine an image feature difference between a target area in a reference image and the target area in the current image, the reference image being a frame of image that is processed before the current image and that comprises the target area;

determine a target figure point location of the target area in the reference image;

determine a target feature point location difference between the target area in the reference image and the target area in the current image according to a feature point location difference determining model and the image feature difference; and position a target feature point in the target area in the current image according to the target feature point location of the target area in the reference image and the target feature point location difference.

14. The apparatus according to claim 13, wherein the target area is a face area, the target feature point comprises a face feature point, and wherein, when the processor executes the computer instructions, the processor is configured to further cause the apparatus to:

obtain an image according to a time sequence;

detect a face area in the obtained image;

in response to detecting the face area in the obtained image, determine the obtained image as the reference image; and use a subsequently obtained image after the reference image as the current image.

15. The apparatus according to claim 14, wherein, when the processor executes the computer instructions, the processor is configured to further cause the apparatus to:

query a reference image replacement condition; and use the current image as a new reference image when the reference image replacement condition is met.

16. The apparatus according to claim 14, wherein, when the processor is configured to cause the apparatus to determine the target figure point location of the target area in the reference image, the processor is configured to cause the apparatus to:

position the face area in the reference image;

capture a reference face image according to the face area located in the reference image;

input the reference face image to a first image feature extraction model;

obtain a reference image feature outputted by the first image feature extraction model; and use the reference image feature as an input to a feature point positioning model to obtain the target feature point location of the target area in the reference image.

17. The apparatus according to claim 16, wherein, when the processor is configured to cause the apparatus to use the reference image feature as the input to the feature point positioning model to obtain the target feature point location of the target area in the reference image, the processor is configured to cause the apparatus to:

determine a first confidence level of the reference face image according to a first target determining model and the reference image feature; and when the first confidence level reaches a first preset confidence level threshold, use the reference image feature as the input to the feature point positioning model, to obtain the target feature point location of the target area in the reference image.

18. The apparatus according to claim 13, wherein, when the processor is configured to cause the apparatus to position the target area in the current image, the processor is configured to cause the apparatus to:

query a target feature point location of a target area in a previous frame of image of the current image;

determine a target preselection area in the current image according to the queried target feature point location of the target area in the previous frame of image; and expand the target preselection area in the current image according to a preset multiple, to obtain the target area in the current image.

19. The apparatus according to claim 13, wherein, when the processor is configured to cause the apparatus to determine the image feature difference between the target area in the reference image and the target area in the current image, the processor is configured to cause the apparatus to:
- calculate an image pixel difference between the target area in the reference image and the target area in the current image;
- input the image pixel difference to a second image feature extraction model; and
- obtain the image feature difference outputted by the second image feature extraction model.

20. A non-transitory storage medium for storing computer readable instructions, the computer readable instructions, when executed a processor, causing the processor to:

position a target area in a current image;
determine an image feature difference between a target area in a reference image and the target area in the current image, the reference image being a frame of image that is processed before the current image and that comprises the target area;
determine a target figure point location of the target area in the reference image;
determine a target feature point location difference between the target area in the reference image and the target area in the current image according to a feature point location difference determining model and the image feature difference; and
position a target feature point in the target area in the current image according to the target feature point location of the target area in the reference image and the target feature point location difference.

* * * * *